(12) United States Patent
Kang et al.

(10) Patent No.: US 8,750,153 B2
(45) Date of Patent: Jun. 10, 2014

(54) METHOD AND APPARATUS FOR TRANSMITTING FEEDBACK INFORMATION TO TERMINAL IN WIRELESS COMMUNICATION SYSTEM USING COMP TRANSMISSION

(75) Inventors: Ji Won Kang, Anyang-si (KR); Ja Ho Koo, Anyang-si (KR); Bin Chul Ihm, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 13/503,799

(22) PCT Filed: Oct. 25, 2010

(86) PCT No.: PCT/KR2010/007331
§ 371 (c)(1),
(2), (4) Date: Apr. 24, 2012

(87) PCT Pub. No.: WO2011/049415
PCT Pub. Date: Apr. 28, 2011

(65) Prior Publication Data
US 2012/0207055 A1 Aug. 16, 2012

Related U.S. Application Data

(60) Provisional application No. 61/254,740, filed on Oct. 25, 2009, provisional application No. 61/255,482, filed on Oct. 27, 2009.

(30) Foreign Application Priority Data

Feb. 11, 2010 (KR) ........................ 10-2010-0012764

(51) Int. Cl.
*H04W 4/00* (2009.01)
*H04W 24/00* (2009.01)
*H04B 7/04* (2006.01)

(52) U.S. Cl.
USPC ............................................ 370/252; 370/328

(58) Field of Classification Search
None
See application file for complete search history.

(56) References Cited

U.S. PATENT DOCUMENTS 7,526,036 B2 4/2009 Mehta et al.
2008/0233902 A1 9/2008 Pan et al.
(Continued)

FOREIGN PATENT DOCUMENTS

JP 2009-516936 A 4/2009

OTHER PUBLICATIONS

Feng et al., "Coordinated Multi-Point Transmission and Reception for LTE-Advanced," 5th International Conference on Wireless Communications, Networking and Mobile Computing, Sep. 26, 2009, pp. 1-4.

(Continued)

*Primary Examiner* — Chi Pham
*Assistant Examiner* — Soon-Dong D Hyun
(74) *Attorney, Agent, or Firm* — Birch, Stewart, Kolasch & Birch, LLP

(57) ABSTRACT

The present invention relates to a wireless communication system having at least one base station utilizing CoMP (Coordinated Multi-Point) transmission, wherein a terminal receives a reference signal from said at least one base station. If said at least one base station makes a transmission based on said reference signal through Coordinated beamforming (CB), information based on PMI (Precoding Matrix Index) corresponding to each base station is determined. Accordingly, if said at least one base station makes a transmission based on joint processing, phase set information is determined for phase correction of the formed beam. Thus, the present method transmits feedback information, comprising PMI set information based on CB and said phase set information, from said at least one base station to a server base station.

20 Claims, 12 Drawing Sheets

(56) References Cited

U.S. PATENT DOCUMENTS

2009/0262695 A1  10/2009  Chen et al.
2010/0172424 A1* 7/2010  Perets et al. .................. 375/260
2010/0267341 A1* 10/2010 Bergel et al. ................. 455/63.1
2011/0034175 A1* 2/2011  Fong et al. .................... 455/450
2011/0098054 A1* 4/2011  Gorokhov et al. ......... 455/452.1

OTHER PUBLICATIONS

Nakamura et al., "LTE Rel-9 and LTE-Advanced in 3GPP," 3GPP TSG-RAN Chairman, NTT Docomo, Inc., May 19, 2009, pp. 1-26.

Etri, "UE Feedback for Downlink CoMP," 3GPP TSG RAN WG1 Meeting #58bis, Agenda Item 7.5, R1-094314, Miyazaki, Japan, Oct. 12-16, 2009, 6 pages.

* cited by examiner

FIG. 3
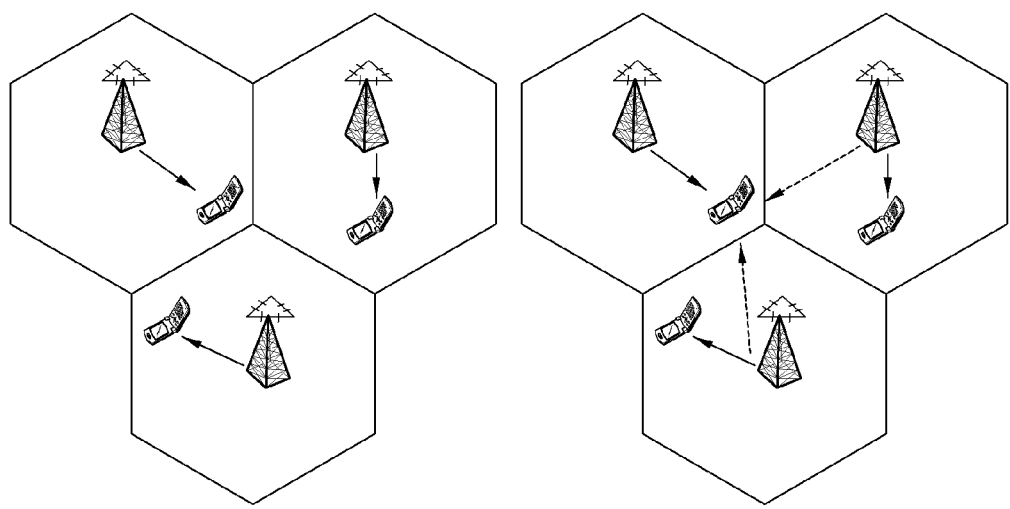
(a)                    (b)
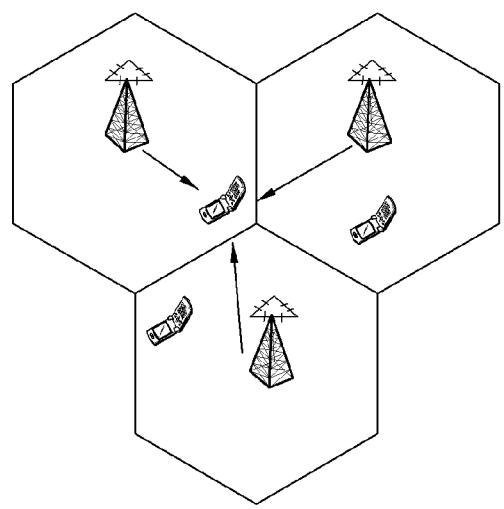
(c)

METHOD AND APPARATUS FOR TRANSMITTING FEEDBACK INFORMATION TO TERMINAL IN WIRELESS COMMUNICATION SYSTEM USING COMP TRANSMISSION

CROSS REFERENCE TO RELATED APPLICATIONS

This application is the National Phase of PCT/KR2010/007331 filed on Oct. 25, 2010, which claims priority under 35 U.S.C. 119(e) to U.S. Provisional Application Nos. 61/254,740 filed on Oct. 25, 2009 and 61/255,482 filed on Oct. 27, 2009 and under 35 U.S.C. 119(a) to Patent Application No. 10-2010-0012764 filed in Republic of Korea on Feb. 11, 2010, all of which are hereby expressly incorporated by reference into the present application.

TECHNICAL FIELD

The present invention relates to a wireless communication system, and more particularly to a method and apparatus for allowing a user equipment (UE) to transmit feedback information in a wireless communication system performing a CoMP (Coordinated Multi-Point) operation.

BACKGROUND ART

Recently, a MIMO system has attracted attention as a wideband wireless mobile communication technology. The MIMO system serves to raise spectrum efficiency in proportion to the number of antennas, which is difficult to achieve in a communication technique employing a conventional single-input single-output (SISO) scheme. MIMO technology refers to a multiple antenna technique for implementing high-speed communication using a plurality of antennas. The MIMO technology is classified into a spatial multiplexing scheme and a spatial diversity scheme, according to whether the same data is transmitted or different data is transmitted.

In the spatial multiplexing scheme, different data is simultaneously transmitted through multiple transmit (Tx) antennas, such that data can be transmitted at high speed without increasing a system bandwidth. Namely, a transmitting side transmits different data using transmit (Tx) antennas and a receiving side discriminates the transmitted data through interference elimination and signal processing, thereby improving transmission rate in proportion to the number of transmit antennas.

The spatial diversity scheme serves to obtain transmit (Tx) diversity by transmitting the same data using multiple transmit (Tx) antennas. The spatial diversity scheme is a kind of a space-time channel coding scheme. The spatial diversity scheme can maximally obtain a transmit diversity gain (performance gain) by transmitting the same data through multiple transmit antennas. The spatial diversity scheme, however, is not a method for improving the transmission rate but a method for improving the reliability of transmission by the diversity gain.

The MIMO technology may be divided into an open-loop type (e.g., Bell labs layered space-time (BLAST), space-time trellis code (STTC), etc.) and a closed-loop type (e.g., transmit adaptive array (TxAA), etc.) according to whether channel information is fed back from a receiving side to a transmitting side. The open loop scheme includes a Bell Laboratories Layered Space-Time (BLAST) in which a transmission side transmits information in parallel, and a reception side detects a signal using a Zero Forcing (ZF) scheme and a Minimum Mean Square Error (MMSE) scheme repeatedly so as to increase the amount of information in proportion to the number of Tx antennas, and also includes a Space-Time Trellis Code (STTC) scheme for obtaining transmission diversity and coding gain using a space domain. The closed loop scheme includes a Transmit Antenna Array (TxAA) scheme, or the like.

FIG. 1 is a conceptual diagram of a Coordinated Multi-Point (CoMP) of the existing intra eNBs and inter eNBs.

Referring to FIG. 1, intra eNBs 110 and 120 and an inter eNB 130 exist in a multi-cell environment. In a Long Term Evolution (LTE) system, an intra eNB covers a plurality of cells (or sectors). Cells covered by an eNB to which a User Equipment (UE) belongs are in an intra eNB relationship with the UE. That is, cells covered by the same eNB that manages a cell in which a UE is located are cells corresponding to the intra eNBs 110 and 120, and cells covered by a different eNB from the eNB that manages the serving cell of the UE are cells corresponding to the inter eNB 130.

Cells covered by the same eNB that serves a UE exchange information (e.g. data and Channel State Information (CSI)) through an x2 interface, while cells covered by a different eNB from the serving eNB of the UE exchange inter-cell information via a backhaul 140. As illustrated in FIG. 1, a single-cell MIMO user 150 located in a single cell (or sector) may communicate with one serving eNB in the cell (or sector), and a multi-cell MIMO user 160 located at a cell edge may communicate with a plurality of serving eNBs in a plurality of cells (or sectors).

The CoMP scheme has been proposed to improve the throughput of a user at a cell edge by applying advanced MIMO in a multi-cell environment. Application of the CoMP scheme to a wireless communication system may not only reduce Inter-Cell Interference (ICI) in the multi-cell environment but may also allow a UE to receive joint data support from multi-cell eNBs. Also, each eNB may improve system performance by simultaneously supporting one or more UEs (or Mobile Stations (MSs)) $MS_1, MS_2, \ldots, MS_K$ using the same radio frequency resources. Further, an eNB may implement Space Division Multiple Access (SDMA) based on CSIs between the eNB and UEs.

The CoMP operation mode may be classified into two modes, a joint processing mode which is cooperative MIMO based on data sharing and a Coordinated Scheduling/Beamforming (CS/CB) mode.

In a CoMP wireless communication system, a serving eNB and one or more neighbor eNBs (or Base Stations (BSs)) $BS_1, BS_2, \ldots, BS_M$ are connected to a scheduler over a backbone network. The scheduler receives feedback channel information representing channel states between the UEs $MS_1$ to $MS_K$ and the neighbor eNBs $BS_1, BS_2, \ldots, BS_M$, as measured by the eNBs. For example, the scheduler may schedule cooperative MIMO information for the serving eNB and the one or more cooperating eNBs. That is, the scheduler issues a command related to a cooperative MIMO operation directly to each eNB.

The CoMP system involves a geographically spaced transmission process (e.g. multi-antenna) as well as joint processing and coordinated scheduling/beamforming techniques between cells. The communication performance of a UE at a cell edge can be improved by CoMP in the multi-cell environment.

However, the existing LTE system does not include an eNB ID for allowing a UE to discriminate between an intra eNB and an inter eNB. Therefore, additional information for enabling the UE to discriminate between the intra eNB and the inter eNB is needed. In addition, although the UE discriminates between the intra eNB and the inter eNB, it is impossible for the UE to recognize which CoMP is to be applied to each intra eNB or each inter eNB. In this case, it is impossible for the UE to properly operate in response to a current situation, such that it is difficult to improve a communication performance of a cell-edge UE.

DISCLOSURE

Technical Problem

Accordingly, the present invention is directed to a method and apparatus for transmitting feedback information by a user equipment (UE) in a wireless communication system utilizing a CoMP operation, so as to substantially obviate one or more problems due to limitations and disadvantages of the related art.

An object of the present invention is to provide a method and apparatus for transmitting integrated feedback information that is capable of being adaptively utilized by a UE according to various transmission modes.

Another object of the present invention is to provide a method for transmitting feedback information using the amount of feedback transmission information required for a CoMP-based wireless communication system utilizing joint processing, such that system performance for use in transmission modes of a single-cell based MIMO scheme, a CoMP-based coordinated beamforming scheme and a joint processing scheme can be optimized.

It is to be understood that objects to be achieved by the present invention are not limited to the aforementioned objects and other objects which are not mentioned will be apparent to those of ordinary skill in the art to which the present invention pertains from the following description.

Technical Solution

The object of the present invention can be achieved by providing a method for transmitting feedback information by a user equipment (UE) in a wireless communication system in which at least one eNode B (eNB) performs a coordinated multi-point (CoMP) operation, the method including receiving a reference signal from the at least one eNB; determining precoding matrix index (PMI) set information corresponding to the at least one eNB when the at least one eNB is operated in a coordinated beamforming (CB) scheme based upon the reference signal; determining phase set information for phase correction of beams formed by the at least one eNB when the at least one eNB is operated in a joint processing (JP) scheme based upon the PMI set information of the CB scheme; and transmitting feedback information including the PMI set information of the CB scheme and the phase set information to a serving eNB from among the at least one eNB, wherein the feedback information is used in a case in which the at least one eNB is operated by the CB scheme and in another case in which the at least one eNB is operated by the JP scheme.

The determining of the PMI set information according to the CB scheme may include determining the PMI set information using a signal to interference ratio (SIR) value between the one or more eNBs.

When the PMI set information is determined to inform neighbor eNBs other than the serving eNB of a PMI for minimizing interference affecting the UE, the PMI set information includes an optimum weight for maximizing the SIR value of the serving eNB and an optimum weight for minimizing the SIR value of the neighbor eNB.

The determining of the phase set information may include changing each index contained in the PMI set information to an index for the JP scheme using predetermined index change calculation; determining PMI set information for the JP scheme using the changed index; and deriving the phase set information from the determined PMI set information of the JP scheme. The index change calculation may be arbitrarily established or may be established to maximize a joint probability mass function (Joint PMF) between the index contained in the PMI set information and the changed index at a specific channel used by the at least one eNB. The index change calculation may be preset between the UE and the at least one eNB, may sequentially use a plurality of index change calculation schemes, or may be shared between the UE and the at least one eNB through broadcast information.

when the PMI set information is determined to inform neighbor eNBs other than the serving eNB of a PMI for maximizing interference affecting the UE, the PMI set information may include an optimum weight for maximizing the SIR value related to the serving eNB and the neighbor eNB. The phase set information may be derived from the PMI set information without execution of index change for the JP scheme.

In another aspect of the present invention, a method for performing a Coordinated Multi-Point (CoMP) operation by an eNode B (eNB) in a wireless communication system includes transmitting a reference signal to a user equipment (UE); receiving feedback information, that includes precoding matrix index (PMI) set information used when the eNB and at least one neighbor eNB are operated in a coordinated beamforming (CB) scheme and phase set information used when the eNB and the at least one neighbor eNB are operated in a joint processing (JP) scheme, from the user equipment (UE); and transmitting a signal by constructing a precoder based upon the feedback information for case in which the eNB and the at least one neighbor eNB are operated in the CB scheme and the eNB and the at least one neighbor eNB are operated in the JP scheme.

The PMI set information corresponding to the CB scheme may be determined using a signal to interference ratio (SIR) value between the eNB and the at least one neighbor eNB.

When the PMI set information is determined to inform the at least one neighbor eNB of a PMI for minimizing interference affecting the UE, the PMI set information may include an optimum weight for maximizing the SIR value of a serving eNB and an optimum weight for minimizing the SIR value of the at least one neighbor eNB.

When eNB transmits a signal with the at least one neighbor eNB using the JP scheme, changing each index contained in the PMI set information is changed to an index for the JP scheme through predetermined index change calculation, and configuring the precoder using the changed index and the phase set information. The index change is performed either through an arbitrarily established calculation process or through a calculation process established to maximize a joint probability mass function (Joint PMF) between the index contained in the PMI set information and the changed index at a specific channel used by the eNB. The index change calculation is pre-established between the UE and the eNB, sequentially uses a plurality of index change calculation schemes, or is shared between the UE and the eNB through broadcast information.

When the PMI set information is configured to inform the at least one neighbor eNB of a PMI for maximizing interference affecting the UE, the PMI set information includes an optimum weight for maximizing the SIR value related to the and the at least one neighbor eNB. The phase set information may be derived from the PMI set information without execution of index change for the JP scheme.

In another aspect of the present invention, a user equipment (UE) for transmitting feedback information in a wireless communication system in which at least one eNB performs a coordinated multi-point (CoMP) operation includes a reception module configured to receive a reference signal from the at least one eNB; a processor configured to determine precoding matrix index (PMI) set information corresponding to the at least one eNB when the at least one eNB is operated in a coordinated beamforming (CB) scheme based upon the reference signal, determining phase set information for phase correction of beams formed by the at least one eNB when the at least one eNB is operated in a joint processing (JP) scheme on the basis of the PMI set information of the CB scheme, and generating feedback information including the PMI set information of the CB scheme and the phase set information; and a transmission module configured to transmit the feedback information to a serving eNB from among the at least one eNB, wherein the feedback information is used in a case in which the at least one eNB is operated by the CB scheme in another case in which the at least one eNB is operated by the JP scheme.

The method may further include a memory configured to store index change calculation to change the index contained in the PMI set information to an index for the JP scheme, when the PMI set information is determined to inform neighbor eNBs other than the serving eNB of a PMI for minimizing interference affecting the UE.

In another aspect of the present invention, an eNode B (eNB) for performing a Coordinated Multi-Point (CoMP) operation in a wireless communication system includes a transmission module for transmitting a reference signal to a user equipment (UE); a reception module configured to receive feedback information, that includes precoding matrix index (PMI) set information used when the eNB and at least one neighbor eNB are operated in a coordinated beamforming (CB) scheme and phase set information used when the eNB and the at least one neighbor eNB are operated in a joint processing (JP) scheme, from the user equipment (UE); and a processor configured to constructing a precoder based up the feedback information in association with one case in which the eNB and the at least one neighbor eNB are operated in the CB scheme and the other case in which the eNB and the at least one neighbor eNB are operated in the JP scheme, and transmitting signals through the transmission module.

The eNode B (eNB) may further include a memory configured to store index change calculation to change the index contained in the PMI set information to an index for the JP scheme, when the PMI set information is determined to inform at least one neighbor eNB other than the serving eNB of a PMI for minimizing interference affecting the UE.

Those skilled in the art will appreciate that the exemplary embodiments of the present invention are merely part of preferred embodiments of the present invention and various embodiments of the present invention reflecting the technical features of the present invention can be derived and understood from the following detailed description of the present invention.

Advantageous Effects

Exemplary embodiments of the present invention have the following effects. In accordance with one aspect of the present invention, a system performance for use in each transmission mode can be optimized through integrated feedback information capable of being adaptively utilized by various transmission modes.

The embodiments can optimize a system performance for use in transmission modes of a single-cell based MIMO scheme, a CoMP-based coordinated beamforming scheme, and a joint processing scheme using the amount of feedback transmission information required for a CoMP-based wireless communication system utilizing the joint processing scheme.

In addition, if a serving eNB does not request feedback for achieving optimum performance in a specific transmission mode, or if a transmission mode is changed to another transmission mode during signal transmission although the serving eNB has requested feedback for a specific transmission mode, the embodiments can adaptively apply the integrated feedback information to a transmission mode.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 3 shows a variety of transmission modes for use in a wireless communication system according to one embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the eNode B (eNB) may refer to an arbitrary node of a network end which communicates with the above terminal, and may include a base station (BS), a Node B (Node-B), an access point (AP) and the like.

Figure 1:
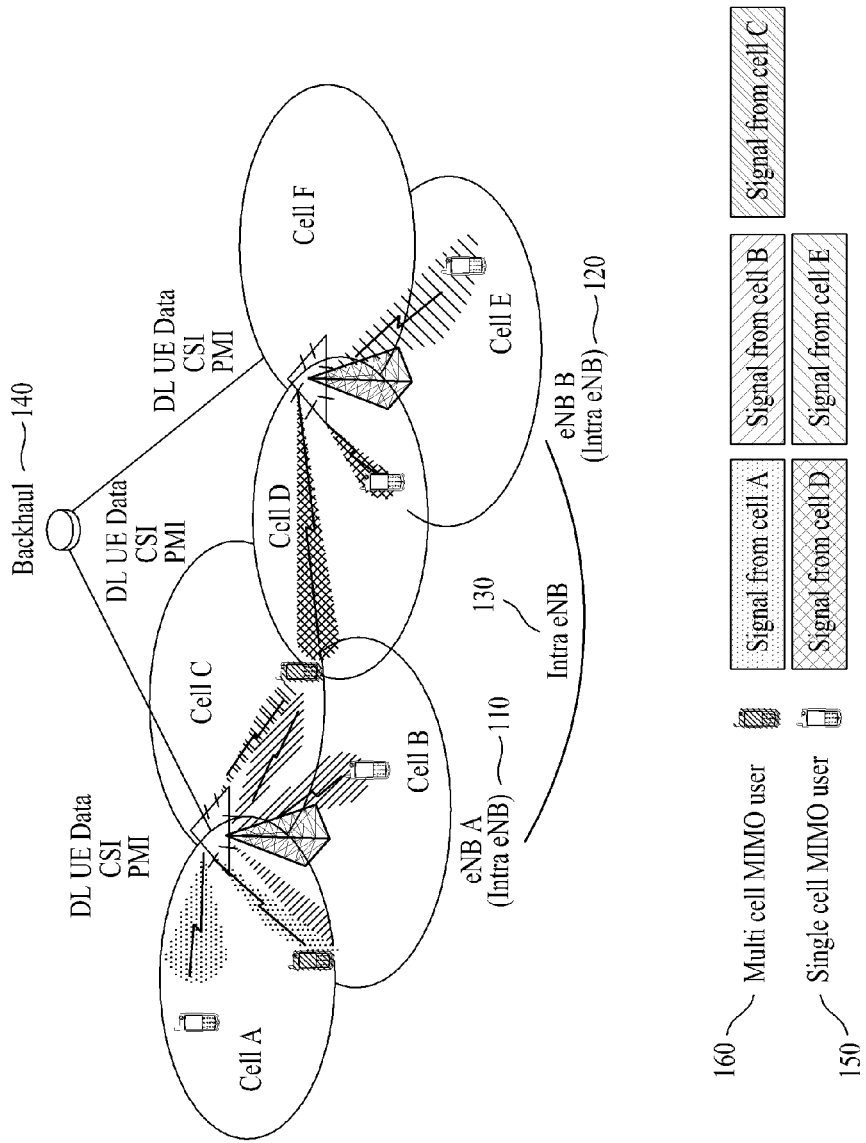
FIG. 1 is a conceptual diagram of a Coordinated Multi-Point (CoMP) of the existing intra eNBs and inter eNBs.
Figure 2:
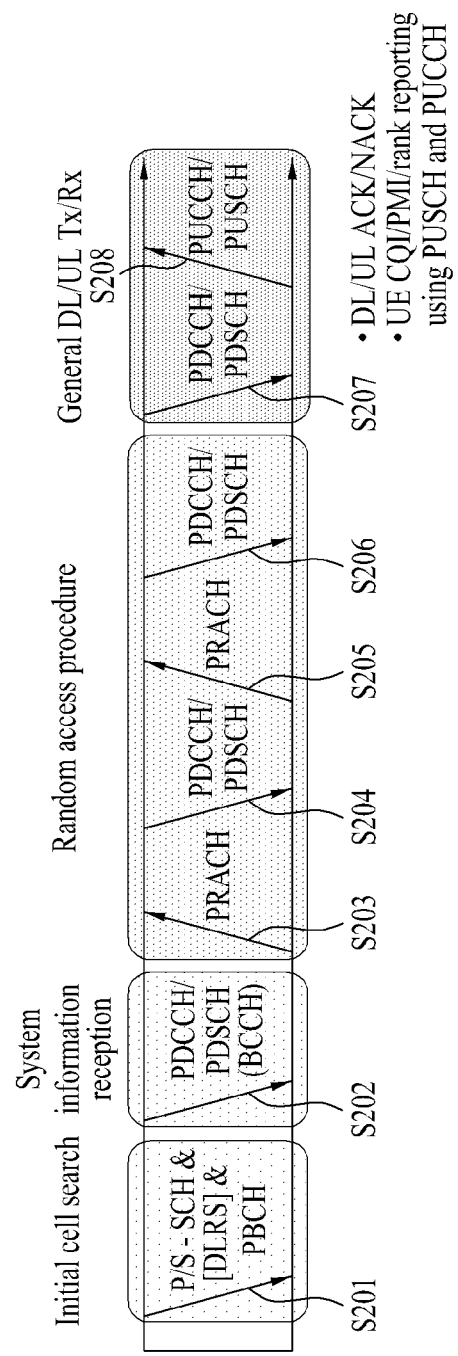
FIG. 2 is a diagram showing physical channels used in a 3GPP LTE system acting as an exemplary mobile communication system and a general signal transmission method using the same.

FIG. 2 is a diagram showing physical channels used in a 3GPP LTE system acting as an exemplary mobile communication system and a general signal transmission method using the same.

Referring to FIG. 2, when powered on or when entering a new cell, a UE performs initial cell search in step S201. The initial cell search involves synchronization with a base station (BS). Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S202.

On the other hand, if the UE initially accesses the BS or if the UE does not have radio resources for signal transmission, it may perform a random access procedure to the BS in steps S203 to S206. For the random access, the UE may transmit a specific sequence as a preamble to the BS on a Physical Random Access CHannel (PRACH) in step S203 and receive a response message for the random access on a PDCCH and a PDSCH corresponding to the PDCCH in step S204. In the case of contention-based RACH other than the handover case, the UE may perform a contention resolution procedure by transmitting an additional PRACH in step S205 and receiving a PDCCH and a PDSCH in step S206.

After the foregoing procedure, the UE may receive a PDCCH and a PDSCH in step S207 and transmit a Physical Uplink Shared CHannel (PUSCH) and a Physical Uplink Control CHannel (PUCCH) in step S208, as a general downlink/uplink (DL/UL) signal transmission procedure. Here, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

The term "eNode B (eNB)" for use in the embodiments of the present invention may also be referred to as a cell or sector. The serving eNB (or cell) may be considered to be an eNB (or cell) for providing the principal services to a UE, and can transmit/receive control information at a coordinated multiple transmission point (CoMP). The serving eNB (or cell) may also be referred to as an anchor eNB (or anchor cell). The serving eNB may transmit a variety of information received from the UE to a neighbor eNB (neighbor cell). Similarly, the neighbor eNB may also be referred to as a neighbor cell in terms of geographical concept. One CoMP set may refer to a set or aggregate of cells, each of which performs the CoMP operation.

The UE may utilize the CoMP technology for improving system performance through either the single-cell based MIMO scheme or the multicell-based eNB cooperation. The CoMP scheme may be classified into a cooperative MIMO (Co-MIMO) joint processing (JP) through data sharing and a coordinated scheduling/beamforming (CS/CB) scheme, and a detailed description thereof will hereinafter be described with reference to FIG. 3.

FIG. 3 shows a variety of transmission modes for use in a wireless communication system according to one embodiment of the present invention.

Referring to FIG. 3, FIG. 3(a) is a conceptual diagram of radio communication between a UE and an eNB for use in a single-cell based MIMO scheme. Each eNB supports each UE located in a cell to which each eNB belongs, such that the UE can transmit only feedback information of the serving cell.

FIG. 3(b) shows an example of coordinated scheduling/beamforming (CS/CB) scheme in which several eNBs for use in the CoMP scheme support a UE located in each cell and at the same time minimizes interference. The CS/CB (hereinafter referred to as only 'CB') scheme allows a UE to transmit the restricted and/or recommended PMI to the serving eNB so as to reduce inter-cell interference. The CB scheme for minimizing the inter-cell interference can classify a method for constructing PMIs of neighbor eNBs into a best companion scheme and a worst companion scheme.

The best companion scheme allows a UE to report a PMI having minimum interference in each cell performing the CoMP to the serving eNB, such that the corresponding neighbor cells use the corresponding PMI, resulting in reduction in inter-cell interference. The best companion scheme can minimize inter-cell interference, resulting in maximum CB performance.

The worst companion scheme enables a UE to report a PMI having maximum interference in each cell performing the CoMP to the serving eNB, such that the corresponding neighbor cells can remove inter-cell interference using a secondary PMI other than PMIs of the corresponding neighbor cells. The worst companion scheme reduces inter-cell interference, and at the same time increases the degree of freedom that is capable of being selected by each neighbor eNB for a user belonging to the neighbor eNB.

FIG. 3(c) shows an example of the joint processing (JP) scheme in which several eNBs located in the vicinity of an arbitrary UE for use in the CoMP scheme simultaneously supports the UE. The JP scheme is considered to be an example of cooperative MIMO schemes through data sharing between eNBs, such that inter-cell interference does not occur.

In order to efficiently perform the multi-cell based CoMP scheme such as the CP or JP scheme, the UE may feed back feedback information including channel information of neighbor cells to the serving eNB. For example, the channel information may include channel state information (CSI), CQI, PMI, RI, noise and interference variance, a Carrier to Interference plus Noise Ratio (CINR) value (also called a signal to interference plug noise ratio (SINR) value), and an improved CINR (or improved SINR) of the serving cell that compares a first CINR (or SINR) measured when a neighbor cell uses a good PMI or does not use a bad PMI with a second CINR (or SINR) measured prior to measurement of the first CINR such that the improvement degree of a channel state of the serving cell can be recognized. The cell having received such channel information shares the above-mentioned channel information with each neighbor cell performing the CoMP operation, and can efficiently perform the CoMP operation according to the shared result.

However, the scheme for calculating the optimized PMI set is changed according to which one of the CB scheme and the JP scheme is utilized in the CoMP operation scheme. The UE estimates a PMI, a CQI, etc. using a reference signal of each eNB, and transmits feedback information without using specific information indicating whether each eNB is going to use either a transmission mode of the single-cell based MIMO scheme or a transmission mode of the CB- or JP-based CoMP scheme. In order to solve the above-mentioned problem, if feedback transmission of all PMI sets optimized for individual transmission modes is completed, the amount of feedback information is excessively increased so that an unexpected problem occurs in feedback overhead.

Therefore, the present invention provides a method for transmitting feedback information capable of being utilized in the CB and JP schemes for use in the single-cell based MIMO scheme and the multicell-based CoMP scheme so as to enable a UE to effectively perform feedback transmission.

In order to explain the CoMP feedback information transmission method of the present invention, the method for calculating PMI feedback information for use in the single-cell based MIMO scheme and the CB or JP scheme of the CoMP operation scheme will hereinafter be described in detail.

The embodiments of the present invention assume that a total of N latent CoMP eNBs are present in the vicinity of a UE, and also assumes that a first eNB from among the N latent CoMP eNBs is a serving eNB of the UE. It is assumed that a channel between the UE and the n-th eNB is denoted by Hn, and a system of the embodiment uses an L-sized Rank-1 codebook having vector codewords W1, W2, . . . , WL.

1. Case Using Single-Cell Based MIMO Scheme

The single-cell based MIMO scheme can enable an UE to estimate a channel $H_1$ using a reference signal transmitted from a first eNB acting as a serving eNB. If the UE uses the Rank-1 codebook, a codeword for maximizing a signal to noise ratio (SNR) gain of a beam forms an optimum beam using the following equation 1. There is a low possibility for generating inter-cell interference under a single cell, such that the precoding vector can be constructed on the basis of the maximized SNR gain.

$$w_{1,SC} = \operatorname*{argmax}_{w_i \in \Omega} \|H_1 w_i\|^2 \qquad \text{[Equation 1]}$$

In Equation 1, $W_{1,SC}$ is a precoding vector for use in the single-cell based MIMO, and $\Omega = \{W_1, W_2, \ldots, W_L\}$ is a codeword set or a codebook.

2. Case Using CB Scheme in CoMP Operation

In at least two multicell-based CoMP operation schemes, the CB scheme is classified into the best companion scheme and the worst companion scheme.

Commonly, the best companion CB scheme and the worst companion CN scheme are used to increase system performance through cooperation of several eNBs. Preferably, the UE may be configured to minimize inter-cell interference when deciding feedback information. Therefore, if maximum ratio combining (MRC) reception beamforming is performed on the basis of channel information used by the serving eNB, the signal to interference ratio (SIR) shown in the following equation 2 is used.

$$SIR = \frac{\|H_1 w_{1,CB}\|^2}{\sum_{n=2}^{N} |w_{n,CB}^H H_n^H H_1 w_{1,CB}|^2} \qquad \text{[Equation 2]}$$

Referring to Equation 2, the precoding vectors $W_{1,CB}$, $W_{2,CB}, \ldots, W_{N,CB}$ are optimized to maximize the SIR capable of minimizing inter-cell interference. In Equation 2, $\|H_1 w_{1,CB}\|^2$ is related to the serving eNB, and $$\sum_{n=2}^{N} |w_{n,CB}^H H_n^H H_1 w_{1,CB}|^2$$

is related to N neighbor eNBs existing in the vicinity of a UE.

However, the method for constructing a PMI set optimized for the CB scheme is classified into the best companion scheme and the worst companion scheme.

(1) If the CB scheme transmits feedback information based on the best companion scheme so as to minimize interference applied from a neighbor cell of a UE to the UE, the UE constructs the best companion PMI set for maximizing the SIR upon receiving beams from the serving eNB and neighbor eNBs. That is, the precoding vector $W_{1,CB}$ used by the serving eNB and the precoding vector $W_{n,CB}$ used by the n-th neighbor eNB can be constructed as shown in the following equation 3.

$$w_{1,CB} = \operatorname*{argmax}_{w_i \in \Omega} \|H_1 w_i\|^2 \qquad \text{[Equation 3]}$$

$$w_{n,CB} = \operatorname*{argmax}_{w_i \in \Omega} |w_i^H H_n^H H_1 w_{1,CB}|^2,$$

$$n = 2, \ldots, N$$

The best companion scheme enables a UE to report the optimized PMI having minimum interference and maximum SIR to the eNB performing the CoMP, and enables the corresponding eNBs to use the corresponding PMI so as to reduce inter-cell interference. The UE feeds back the precoding vector shown in Equation 3 to each eNB. Provided that the feedback precoding vector is denoted by $W_{n,CB}^f$, $W_{n,CB} = W_{n,CB}^f$, n=1, . . . ,N is achieved, and the serving eNB and each neighbor eNB use the PMI fed back from the UE without change.

(2) If the CB scheme enables each neighbor eNB located in the vicinity of a UE uses the worst companion scheme that increases freedom degree of beam selection for a cell user of the neighbor eNB, the UE constructs the worst PMI set that maximizes an SIR of the serving eNB simultaneously while minimizing SIRs of beams of the neighbor eNBs.

That is, provided that the feedback precoding vectors for use in the worst companion are denoted by $W_{1,CB}^f$, $W_{2,CB}^f$, . . . , $W_{N,CB}^f$, the precoding vector $W_{1,CB}^f$ fed back from the serving eNB is determined to maximize the SIR of the entire codebook, and the precoding vectors $W_{2,CB}^f$, . . . , $W_{N,CB}^f$ fed back from the neighbor eNBs are determined to minimize the SIR of the entire codebook, as shown in the following equation 4.

$$w_{1,CB}^f = \underset{w_i \in \Omega}{\operatorname{argmax}} \|H_1 w_i\|^2 \qquad \text{[Equation 4]}$$

$$w_{N,CB}^f = \underset{w_i \in \Omega}{\operatorname{argmax}} |w_i^H H_n^H H_1 w_{1,CB}|^2,$$

$$n = 2, \ldots, N.$$

Therefore, according to the worst companion CB scheme, the serving eNB uses a PMI fed back from a UE ($w_{1,CB} = w_{1,CB}^f$), and the neighbor eNBs use another PMI instead of the PMI fed back from the UE ($w_{n,CB} \neq w_{n,CB}^f$, n=2, . . . , N). For example, each neighbor eNB may establish a precoder that uses only the remaining PMIs other than the worst PMI information fed back from the UE, or may determine a precoder from among several precoding vectors having low correlation with the worst PMI.

3. Case Using JP Scheme in CoMP Operation

In case of using the JP scheme in the CoMP operation, the serving eNB and the neighbor eNBs transmit the same information for a single UE, such that beams of the serving and neighbor eNBs are mixed with each other. Therefore, the serving eNB uses the precoding vector without change, and the neighbor eNBs receives feedback of phase information for phase correction of the precoding vector. The serving eNB uses $W_{1,JP}$ as the precoding vector, and each eNB uses $W_{n,JP} e^{j\theta_n}$ including phase information as the precoding vector. In this case, is $\theta_n$, n=2, . . . , N is determined by K phases $\theta_1, \theta_2, \ldots, \theta_K$.

According to the JP scheme, all eNBs transmit the same information to a single UE so that no interference occurs, and it is preferable that a gain of mixed beam be maximized for optimum performance. The beam gain acquired when MRC reception beamforming is performed using the mixed beam can be represented by the following equation 5.

$$PowerGain = \qquad \text{[Equation 5]}$$
$$\sum_{n=1}^{N} \|H_n w_{n,JP}\|^2 + 2Re\left\{\sum_{i=1}^{N-1}\sum_{j=i+1}^{N} w_{j,JP}^H H_j^H H_i w_{i,JP} e^{j(\theta_i - \theta_j)}\right\},$$

where $\theta_1 = 0$

If optimization for each component is performed to maximize the beam gain of Equation 5, the following equations 6 and 7 can be obtained as follows.

$$w_{n,JP} \operatorname*{argmax}_{w_i \in \Omega} \|H_n w_i\|^2, \qquad \text{[Equation 6]}$$
$$n = 1, \ldots, N$$

$$\{\theta_{2,JP}, \theta_{3,JP}, \ldots, \theta_{N,JP}\} = \arg \max_{\{\theta_2, \theta_3, \ldots, \theta_N\} \in A^{N-1}} Re \qquad \text{[Equation 7]}$$
$$\left\{\sum_{i=1}^{N-1}\sum_{j=i+1}^{N} w_{j,JP}^H H_j^H H_i w_{i,JP} e^{j(\theta_i - \theta_j)}\right\}, \theta_1 = 0$$

It is difficult to discriminate between phases of neighbor eNBs maximizing the beam gain according to individual components. The number of neighbor eNBs that is located in the vicinity of one UE so as to transmit the same data is generally set to 3, and K for phase decision is set to 4 or less, such that joint optimization can be performed as shown in Equation 7.

As described above, the scheme for determining feedback information for performance optimization of the CB and JP schemes is differently determined according to the single-cell based MIMO scheme and the multicell-based CoMP scheme. Therefore, the present invention provides a method for transmitting feedback information that can be used in the JP and CB schemes for use in the multicell-based CoMP scheme and the single-cell based MIMO scheme so as to efficiently transmit feedback information of the UE.

First, the serving eNB can obtain the same precoding vector irrespective of the CB or JP scheme of the CoMP scheme and the single-cell based MIMO scheme. In other words, it can be recognized that $W_{1,SC} = W_{1,CB} = W_{1,JP}$ is achieved as shown in Equations 1, 3, and 6, such that a PMI of the serving eNB can be determined irrespective of categories of transmission modes.

Next, the precoding vector for the neighbor eNB may be differently constructed according to the CB or JP scheme of the CoMP scheme.

Figure 4:
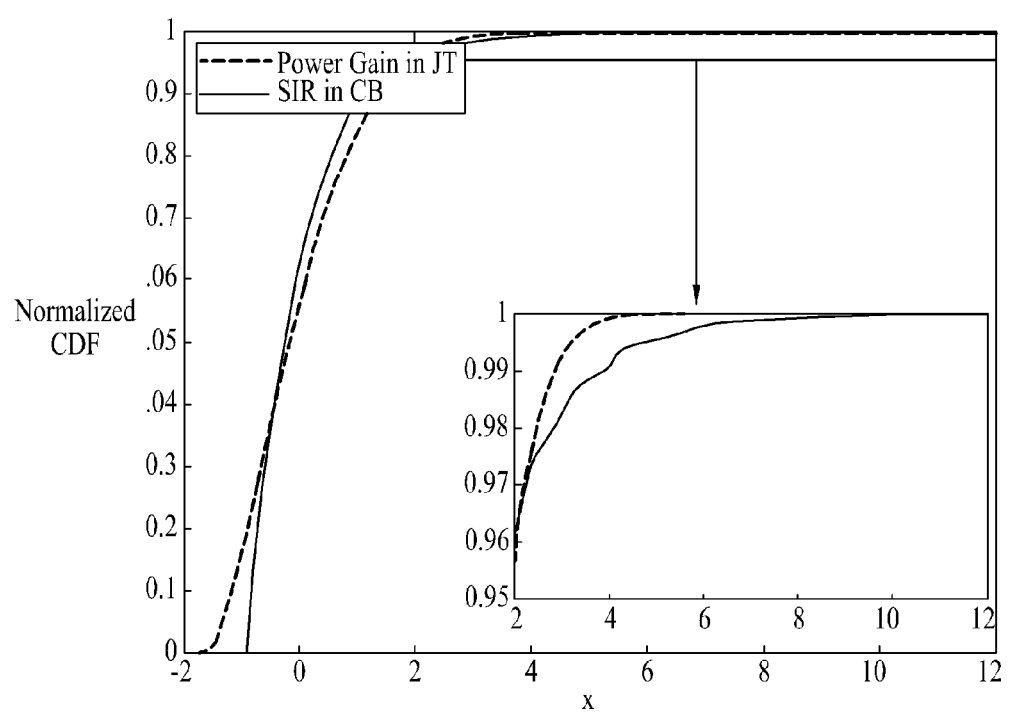
FIG. 4 is a diagram illustrating an example of system performance based on a precoding matrix index (PMI) for use in a CoMP according to one embodiment of the present invention.

FIG. 4 shows not only system performance acquired when an arbitrary precoder is used in the CoMP related to one embodiment of the present invention, but also an exemplary graph. In more detail, FIG. 4 shows the comparison results of SIR sensitivity acquired when the precoder is used in the CB scheme and a beam gain acquired when the precoder is used in the JP scheme. In FIG. 4, a horizontal axis is an SIR criterion in case of the CB scheme and is a beam gain criterion in case of the JP scheme; and a vertical axis is a cumulative density function (cdf) of the CoMP performance in case of the CB or JP scheme. Referring to FIG. 4, although the CoMP performance is increased in proportion to the SIR or the beam gain, CoMP performance deterioration generated in the CB scheme is greater than CoMP performance deterioration generated in the JP scheme under the condition that the wrong precoder is selected at a predetermined value or higher. In more detail, the SIR sensitivity for precoder selection in case of the CB scheme is greater than beam gain sensitivity for precoder selection in case of the JP scheme. As a result, if optimization of the precoder is not achieved for the neighbor eNB as shown in Equation 2, a denominator part of the SIR is increased and the SIR is reduced.

Therefore, the present invention provides a method for transmitting integrated feedback information using feedback information optimized for the CB scheme, such that the integrated feedback information can be utilized without deteriorating the system performance on the basis of the feedback information optimized for the CB scheme.

As described above, the PMI of the serving eNB is denoted by $W_{1,SC}=W_{1,CB}=W_{1,JP}$, such that an example for determining the precoding vector $W_n^*$ (n=2, ..., N) acting as feedback information of the neighbor eNB will hereinafter be described in detail.

First Embodiment (Best Companion CB Scheme is Used)

Figure 5:
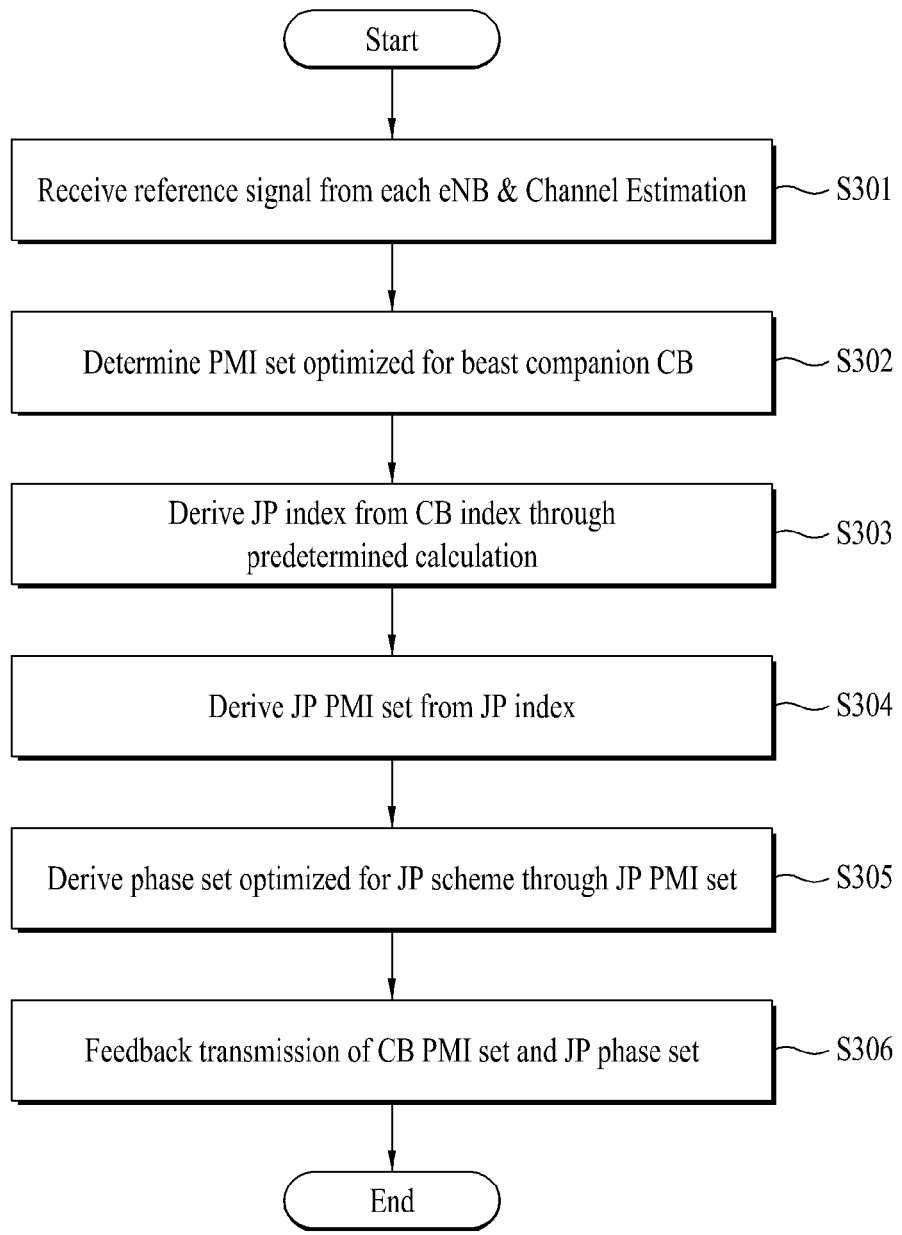
FIG. 5 is a flowchart illustrating a method for transmitting integrated feedback information according to one embodiment of the present invention.

FIG. 5 is a flowchart illustrating a method for transmitting integrated feedback information according to one embodiment of the present invention. In more detail, FIG. 5 shows examples of the CB scheme based on the best companion scheme.

Referring to FIG. 5, the UE according to one embodiment of the present invention receives a reference signal from each eNB and estimates a channel $H_n$ of each eNB in step S301. The PMI set optimized for the CB scheme having higher performance sensitivity for the precoder is determined. In this case, the PMI set may be determined according to the best companion scheme in step S302.

If feedback transmission of the PMI set determined by the best companion scheme is achieved and eNBs configure/use associated precoders, beams formed by the eNBs minimize the inner product between the precoding vector $H_1 W_{1,CB}$ of the serving eNB and the precoding vector $H_n W_{n,CB}$(n>1) of the n-th neighbor eNB, such that $H_n W_{n,CB}$ (n>1) is reduced in size. Therefore, $w_{n,CB} \neq w_{n,JP}$, n=2, ..., N needs to be accomplished. That is, if the PMI set optimized for the CB scheme is applied to the JP scheme without change, the JP performance may be deteriorated. In order to solve this problem, the UE calculates an index for the JP scheme from an index for the CB scheme using the codeword index equations respectively used in two predetermined schemes in step S303. The precoding vector for each eNB is derived from the JP scheme using the calculated JP index, such that the PMI set for the JP scheme is configured in step S304. The phase set optimized for the JP scheme is determined through the calculated JP PMI set in step S305. The PMI set optimized for the CB scheme determined at step S302 and the phase set optimized for the JP scheme determined at step S305 are simultaneously fed back to the serving eNB in step S306.

A brief description of individual steps will be given below.

In step S302, the UE may determine the PMI set optimized for the CB scheme as feedback information as shown in the following equation 8.

$$w_1^* = \underset{w_i \in \Omega}{\arg\max} \|H_1 w_i\|^2, \quad \text{[Equation 8]}$$

$$w_n^* = \underset{w_i \in \Omega}{\arg\max} |w_i^H H_n^H H_1 w_1^*|^2,$$

$$n = 2, \ldots, N$$

In Equation 8, the PMI set may be configured according to the above-mentioned best companion CB scheme using Equations 2 and 3. $W_1^*$ is a precoding vector for the serving eNB, and $W_n^*$ is a precoding vector for the n-th neighbor eNB from among neighbor eNBs located in the vicinity of the UE. The PMI sets for the serving eNB and the neighbor eNB are configured to maximize the SIR.

Next, the UE calculates the JP PMI set through the codeword index relationship $W_{n,JP}=f(W_{n,CB})$ predetermined between the CB index (n) and the JP index (m) in step S303. Since the optimum relationship between two indexes is changed according to a channel status, an implementation user may arbitrarily establish the optimum index relationship or may experimentally calculate the optimum index relationship under a specific channel environment.

Equation 9 shows one example of a specific relationship for experimentally calculating the optimum JP index (m) on the basis of the CB index (n).

$$m^*(n) = \underset{m=1,\ldots,L}{\arg\max} \, p(m/n) \text{ for all } n \quad \text{[Equation 9]}$$

In Equation 9, a joint probability mass function (PMF) P(n,m) (where n=1, ..., L, and m=1, ..., L) between the CB index (n) and the JP index (m) is estimated, and a new JP index (m*(n)) for maximizing the joint PMF for each CB index (n) is calculated.

If the relationship between the CB index optimized for the specific channel environment and the JP index is established as described above, the UE determines the JP PMI set on the basis of the JP index in step S304, and determines the phase set optimized for the JP scheme on the basis of the JP PMI set in step S305, as shown in the following equation 10.

$$\{\theta_2^*, \theta_3^*, \ldots, \theta_N^*\} = \quad \text{[Equation 10]}$$

$$\underset{\{\theta_2, \theta_3, \ldots, \theta_N\}}{\arg\max} Re\left\{\sum_{i=1}^{N-1} \sum_{j=i+1}^{N} w_j'^H H_j^H H_i w_i' e^{j(\theta_i - \theta_j)}\right\}$$

In Equation 10, $W_n'$ is the JP precoding vector of the n-th neighbor eNB by changing the CB index of Equation 8 to the JP index of Equation 9, and $\{\theta_2^*, \theta_3^*, \ldots, \theta_N^*\}$ is phase set feedback information optimized for the JP scheme.

Therefore, according to one embodiment of the present invention, the UE determines the PMI set optimized for the best companion CB scheme, performs index change using Equation 9, and determines the phase set optimized for the JP scheme, such that the determined results are fed back to the eNBs.

Upon receiving the integrated feedback information, each eNB may configure the optimum precoder on the basis of the feedback information according to transmission modes. For example, if the transmission mode is determined to be a single-cell based MIMO, the serving eNB determines the precoder using $W_1^*=W_{1,CB}$ of Equation 1. If the transmission mode is determined to be a CB scheme, the serving eNB and each neighbor eNB may determine the precoder using $(W_1^*, W_2^*, \ldots, W_N^*)=(W_{1,CB}, W_{2,CB}, \ldots, W_{N,CB})$ of Equation 3 or 8. If the transmission mode is determined to be the JP mode, the serving eNB may use $W_1^*=W_{1,CB}$, and each neighbor eNB may determine the precoder using $W_1^*, W_2', \ldots, W_n'$ and $\theta_2^*, \theta_3^*, \ldots, \theta_N^*$ calculated through the CB precoding vector.

Figure 6:
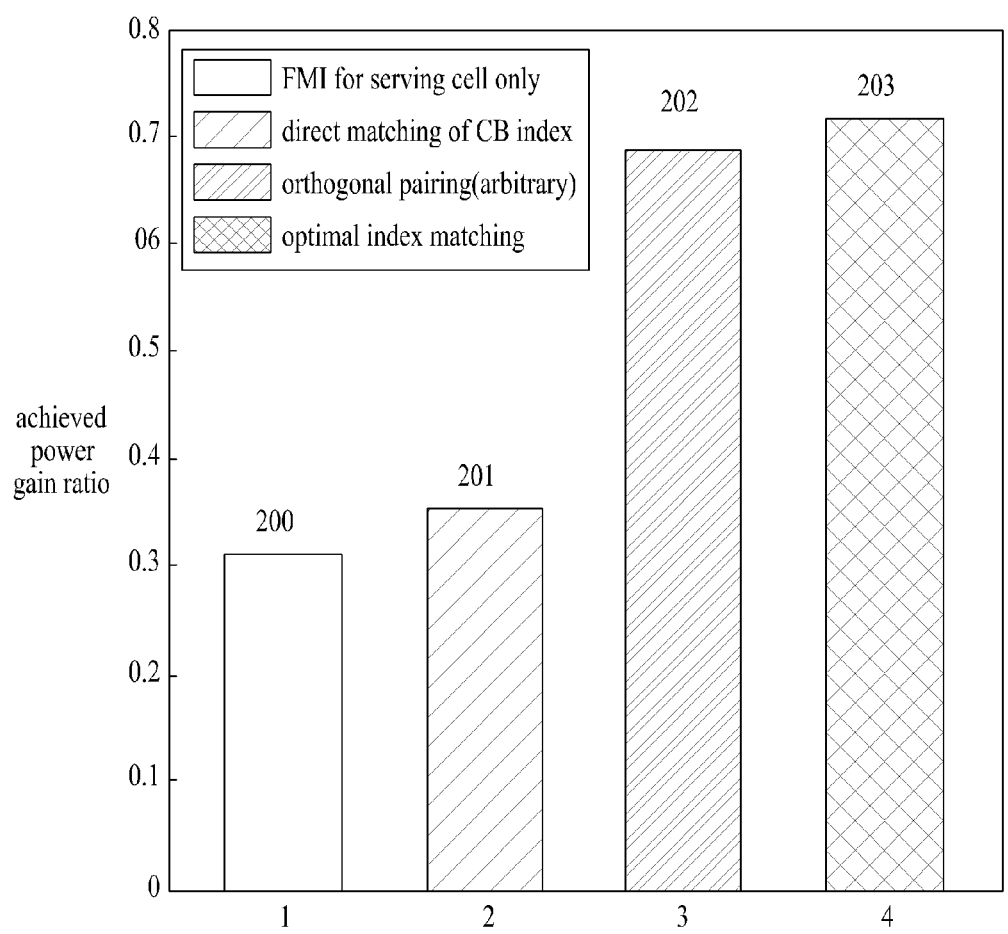
FIG. 6 shows an example of a beam gain performance comparison acquired by a precoder utilizing integrated feedback information under the condition that the joint processing (JP) scheme is used in the CoMP operation.

FIG. 6 shows an example of a beam gain performance comparison acquired by a precoder utilizing integrated feedback information under the condition that the joint processing (JP) scheme is used in the CoMP operation. In more detail, FIG. 6 shows a beam gain ratio acquired when the precoder is configured using another feedback information on the basis of a specific case in which the precoder is configured using feedback information optimized for the JP scheme, such that the performance comparison for feedback information is achieved as shown in FIG. 6.

For this purpose, the embodiment shown in FIG. 6 assumes that, in the MIMO system utilizing 100,000 different channels, the number of serving eNB antennas is set to 4 (K=4), the number of UE antennas is set to 2, the number of neighbor eNBs is set to 3, and the LTE codebook (L=16) of the 4-bits Rank-1 and the 2-bits uniform phase set $$A = \left\{0, \frac{\pi}{2}, \pi, \frac{3\pi}{2}\right\}$$

are utilized. The correlation factor between antennas of the eNB is set to zero '0'.

Referring to FIG. 6, the first bar graph shows the beam gain ratio for use in a specific case in which the neighbor eNBs other than the serving eNB in association with the use of the precoder utilizing feedback information optimized for the JP scheme do not use feedback information and arbitrarily configures the precoder. For example, the eNBs may configure the precoder using the PMI set including a companion not optimized for each scheme of the CB- or JP-based CoMP.

The second bar graph shows the beam gain ratio for use in a specific case in which the precoder is configured using the CB PMI set and the phase set of the JP best companion scheme, in association with the use of the precoder using feedback information optimized for the JP scheme. In this case, the phase set is optimized for the JP scheme at a PMI set given by Equation 7.

The third or fourth bar graph shows the beam gain ratio for use in an exemplary case in which the precoder is configured using the integrated feedback information.

The third bar graph shows the beam gain ratio acquired when the precoder is configured under the condition that the CB index is changed to the JP index according to the relationship arbitrarily established by the implementation user in association with the use of the precoder utilizing feedback information optimized for the JP scheme. For example, the codebook indexes of the 4-bits codebook are configured in the form of orthogonal pairs, 1-2, 3-4, . . . , 15-16 indexes are combined according to the arbitrary pair relationship so as to construct the JP index, such that the precoder may be configured through the result pairs of the indexes.

The fourth bar graph shows the beam gain obtained when the optimum relationship between the CB PMI index and the JP PMI index is acquired from a current channel through several experiments and the acquired relationship is utilized. For example, the fourth bar graph shows the beam gain, under the condition that the optimum JP index is acquired from the CB index through the predetermined relationship between the CB index and the JP index of Equation 8, and the precoder is configured using the phase set configured through the acquired JP index.

As can be seen from FIG. 6, when using feedback information comprised of the CB PMI set and the phase set calculated by optimization of the CB index and the JP index, the embodiment of the present invention can obtain a high beam gain of 70% or greater as compared to performance obtained when feedback information optimized for the JP scheme is used. Feedback information according to one embodiment of the present invention includes a PMI set optimized for the CB scheme, such that the embodiment can satisfy maximum performance of the single-cell based MIMO scheme or the CB scheme. In addition, through the optimum relationship between indexes, the embodiment of FIG. 6 can implement higher performance as compared to the JP scheme that configures the phase set using the CB index without change.

Figure 7:
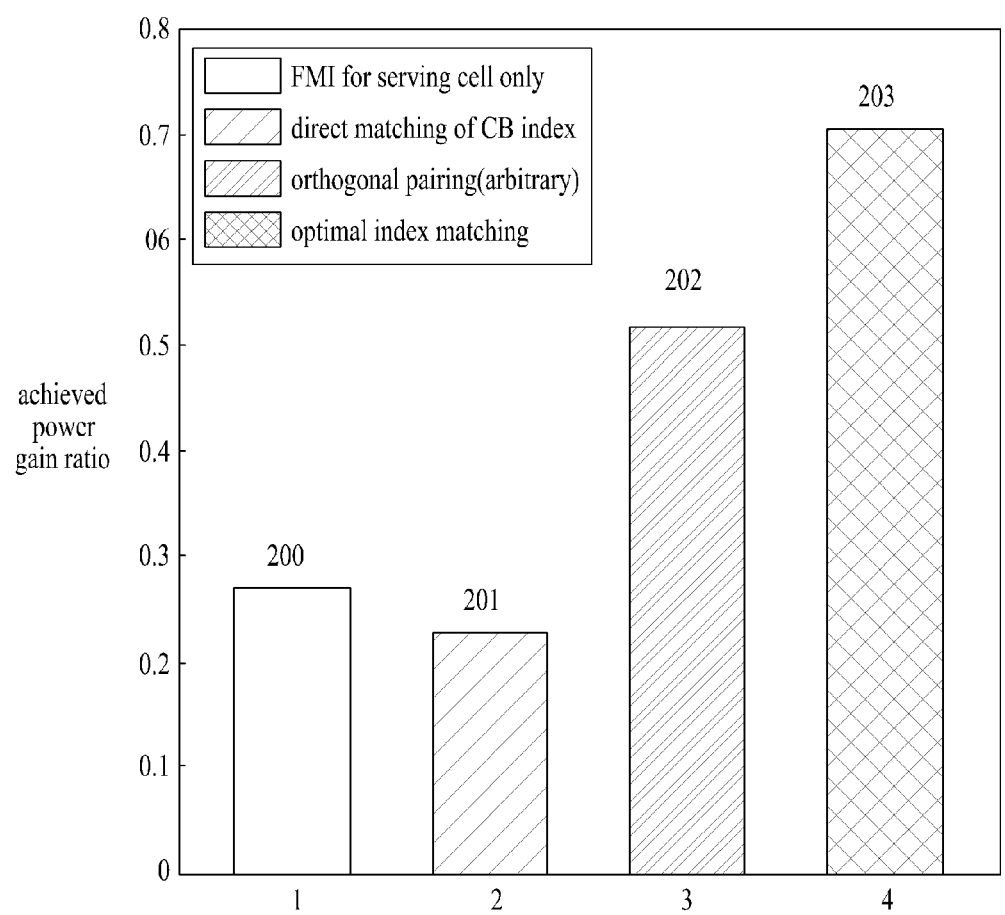
FIG. 7 shows another example of a beam gain performance comparison acquired by a precoder utilizing integrated feedback information under the condition that the joint processing (JP) scheme is used in the CoMP operation.

FIG. 7 shows another example of a beam gain performance comparison acquired by a precoder utilizing integrated feedback information under the condition that the joint processing scheme is used in the CoMP operation. In FIG. 6, it is assumed that the correlation between the eNB antennas is set to 0.9 under the condition that the eNB and the UE have the same environment.

Similar to FIG. 6, FIG. 7 shows a beam gain ratio acquired when the precoder is configured using another feedback information on the basis of a specific case in which the precoder is configured using feedback information optimized for the JP scheme, such that the performance comparison for feedback information is achieved as shown in FIG. 7.

The beam gain ratio of FIG. 7 is reduced according to correlation between eNB antennas as compared to the embodiment of FIG. 6. Specifically, referring to the second bar graph of FIG. 7, if correlation between the eNB antennas is high in level and the CB PMI set for the best companion scheme is applied to the JP scheme without change, the beam gain performance is reduced as compared to the other case in which the precoder is arbitrarily configured without using feedback information.

However, although the correlation between the eNB antennas is high in level, since the embodiment of the present invention calculates the JP PMI set in response to an index change for the JP scheme on the basis of the PMI set of the CB scheme and configures the precoder using the associated phase set, the embodiment of FIG. 7 can obtain higher beam gain performance as compared to the other cases. In addition, although the correlation between the eNB antennas is high in level, the embodiment utilizes the integrated feedback information, such that it satisfies performance of 70% or higher as compared to the other case in which feedback information optimized for the JP scheme is utilized.

Second Embodiment (Worst Companion CB Scheme)

Figure 8:
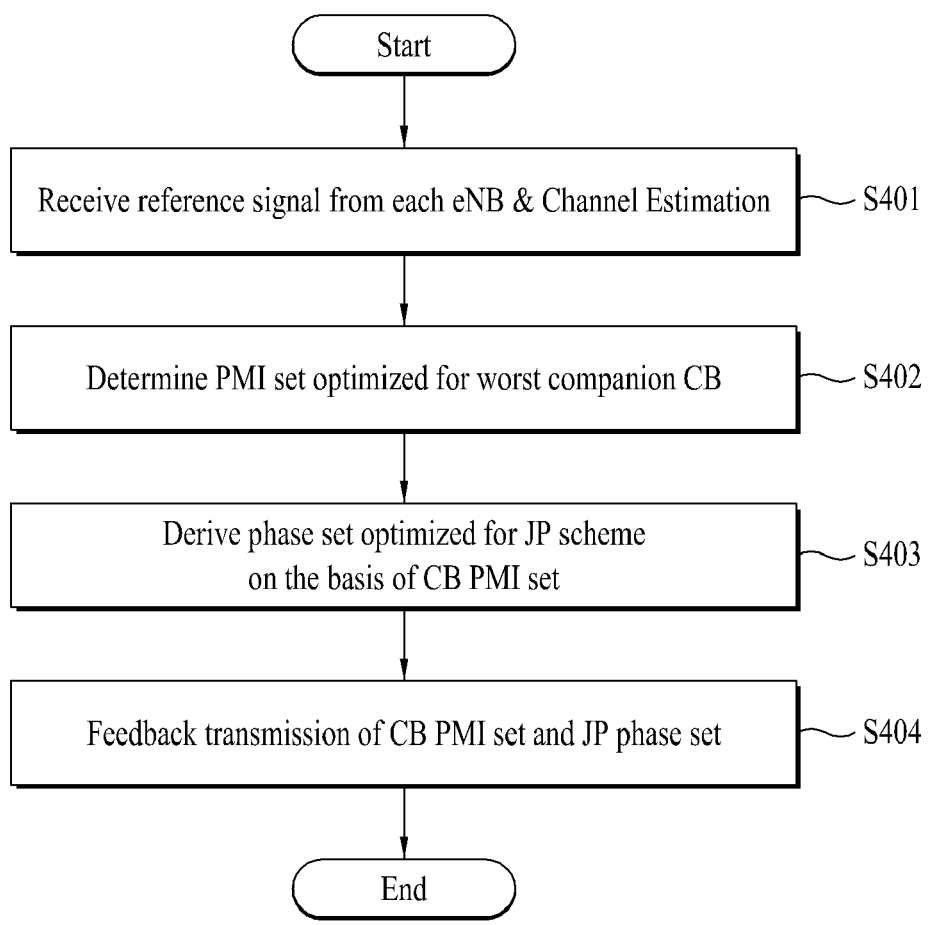
FIG. 8 is a flowchart illustrating another example of a method for transmitting integrated feedback information according to one embodiment of the present invention.

FIG. 8 is a flowchart illustrating another example of a method for transmitting integrated feedback information according to one embodiment of the present invention. In more detail, FIG. 8 exemplarily shows the CB scheme based on the worst companion scheme.

Referring to FIG. 8, the UE according to one embodiment of the present invention receives a reference signal from each eNB, and estimates a channel $H_n$ of each eNB in step S401.

The optimized PMI set for use in the CB scheme having higher performance sensitivity in association with the precoder is determined, and the PMI set may be determined according to the worst companion scheme in step S402.

In this case, since beams formed when the eNBs use the PMI set determined by the worst companion CB scheme can maximize the inner product between one precoding vector $H_1 W_{1,CB}$ of the serving eNB and the other precoding vector $H_n W_{n,CB}$ (n>1) of the n-th neighbor eNB, $H_n W_{n,CB}$ (n>1) is increased in size. Therefore, in order to generate the integrated feedback information according to one embodiment of the present invention, the UE does not perform index change of the CB PMI set and uses the CB PMI set without change, such that the phase set optimized for the JP scheme is determined in step S403.

Thereafter, the UE feeds back the PMI set optimized for the worst companion CB scheme determined at step S402 and the PMI set optimized for the JP scheme determined at step S403 to the serving eNB in step S404.

A brief description of individual steps will be given below.

In step S402, the UE may determine the PMI set optimized for the CB scheme as feedback information as shown in the following equation 11.

$$w_1^* = \underset{w_i \in \Omega}{\arg\max} \|H_1 w_i\|^2,$$

$$w_n^* = \underset{w_i \in \Omega}{\arg\max} |w_i^H H_n^H H_1 w_1^*|^2,$$

$$n = 2, \ldots, N$$

[Equation 11]

In Equation 11, the PMI set may be configured according to the above-mentioned worst companion CB scheme using Equations 2 and 4. $W_1^*$ is a precoding vector for the serving eNB, and $W_n^*$ is a precoding vector for the n-th neighbor eNB from among neighbor eNBs located in the vicinity of the UE. The PMI sets for the serving eNB and the neighbor eNB are configured to maximize the SIR.

In step S403, the phase set optimized for the JP scheme is determined using the CB PMI set decided by Equation 11.

$$\{\theta_2^*, \theta_3^*, \ldots, \theta_N^*\} =$$

$$\underset{\{\theta_2, \theta_3, \ldots, \theta_N\}}{\arg\max} Re\left\{\sum_{i=1}^{N-1} \sum_{j=i+1}^{N} w_j^{*H} H_j^H H_i w_i^* e^{j(\theta_i - \theta_j)}\right\}$$

[Equation 12]

Referring to Equation 12, although the optimized PMI set is utilized according to the worst companion CB scheme, the inner product between the vector $H_1 W_{1,CB}$ and the precoding vector $H_n W_{n,CB}$ (n>1) of the n-th neighbor eNB is maximized. In other words, the inner product $W_j^{*H} H_j^H H_i W_i^*$ of Equation 12 is maximized. Therefore, a first method for utilizing the phase set acquired through the CB PMI set optimized for the CB scheme is more preferable in phase correction than a second method for utilizing the phase set acquired through the JP PMI set optimized for the JP scheme, and the first method has more improved SIR performance as compared to the second method.

Therefore, if the UE according to one embodiment of the present invention transmits the integrated feedback information including the CB PMI set and the JP phase set to each eNB, each eNB can configure the precoder appropriate for each transmission mode.

For example, if the transmission mode is the single-cell based MIMO mode, the serving eNB determines the precoder using $W_1^* = W_{1,CB}$ of Equation 1. If the transmission mode is the CB mode, the serving eNB and the neighbor eNBs determine the precoder using $(W_1^*, W_2^*, \ldots, W_N^*) = (W_{1,CB}, W_{2,CB}, \ldots, W_{N,CB})$ of Equation 3 or 11. If the transmission mode is the JP mode, the serving eNB and the neighbor eNB can determine the precoder using $(W_1^*, W_2^*, \ldots, W_N^*) = (W_{1,CB}, W_{2,CB}, \ldots, W_{N,CB})$ and $\theta_2^*, \theta_3^*, \ldots, \theta_N^*$.

Figure 9:
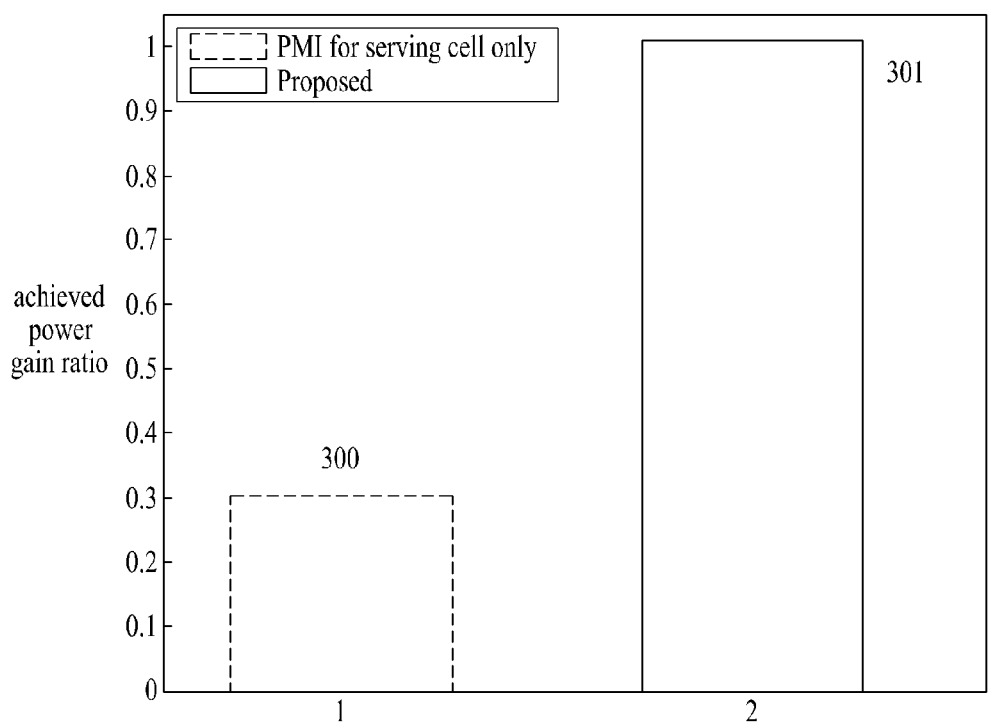
FIG. 9 shows another example of a beam gain performance comparison acquired by a precoder utilizing integrated feedback information under the condition that the joint processing (JP) scheme is used in the CoMP operation.

FIG. 9 shows another example of a beam gain performance comparison acquired by a precoder utilizing integrated feedback information under the condition that the joint processing (JP) scheme is used in the CoMP operation. Provided that the eNB and the UE have the same environment as shown in FIG. 6, the correlation between the eNB antennas of FIG. 9 is set to zero '0' and the phase set of FIG. 9 is comprised of 2 bits.

In more detail, FIG. 9 shows a beam gain ratio acquired when the precoder is configured using another feedback information on the basis of a specific case in which the precoder is configured using feedback information optimized for the JP scheme, such that the performance comparison for feedback information is shown in FIG. 9.

Referring to FIG. 9, the first bar graph shows the beam gain ratio for use in a specific case in which the neighbor eNBs other than the serving eNB in association with the use of the precoder utilizing feedback information optimized for the JP scheme do not use feedback information and arbitrarily configures the precoder. For example, the eNBs may configure the precoder using the PMI set including a companion not optimized for each scheme of the CB- or JP-based CoMP.

The second bar graph shows the beam gain ratio for use in a specific case in which the precoder is configured by the phase set optimized for the JP scheme using the PMI set and the phase set optimized for the worst companion CB scheme, in association with the use of the precoder using feedback information optimized for the JP scheme. In this case, a first case in which the precoder is configured using both the PMI set and the phase set optimized for the JP scheme as feedback information of the JP transmission mode has higher performance of 100% or higher as compared to another case in which the precoder is configured using the PMI set optimized for the CB scheme, because the phase correction effect of the PMI set optimized for the CB scheme is better than the phase correction effect optimized for the JP scheme.

Figure 10:
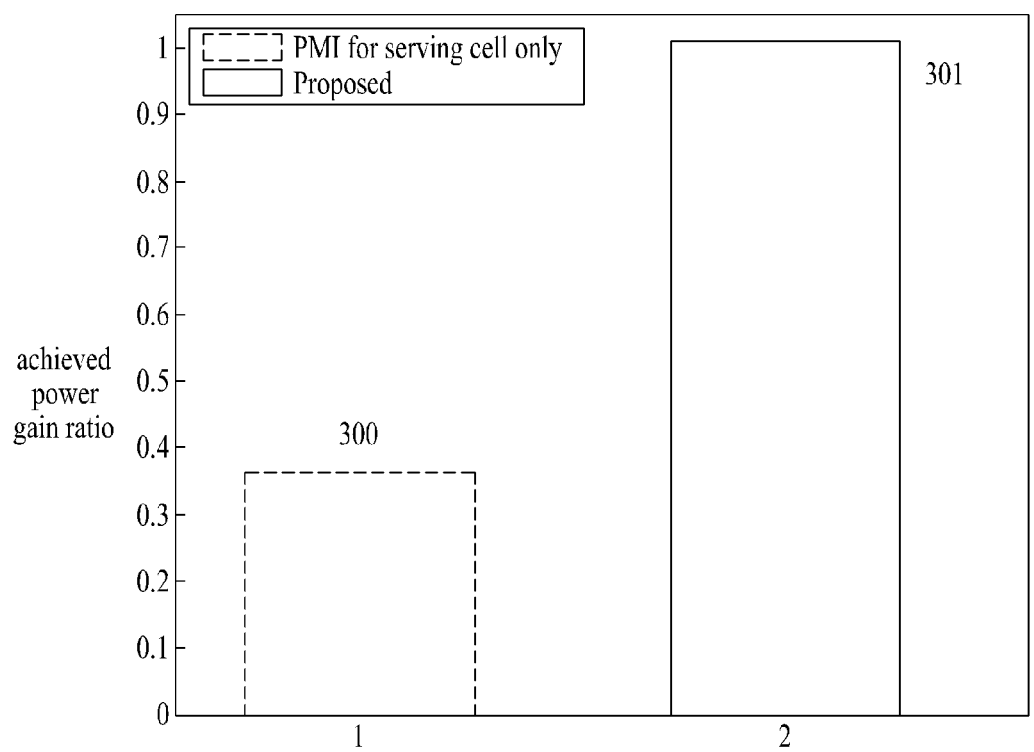
FIG. 10 shows another example of a beam gain performance comparison acquired by a precoder utilizing integrated feedback information under the condition that the joint processing (JP) scheme is used in the CoMP operation.

FIG. 10 shows another example of a beam gain performance comparison acquired by a precoder utilizing integrated feedback information under the condition that the joint processing (JP) scheme is used in the CoMP operation. Provided that the eNB and the UE have the same environment as shown in FIG. 6, the correlation between the eNB antennas of FIG. 10 is set to zero '0' and the phase set of FIG. 10 is comprised of only one bit.

Referring to the second bar graph of FIG. 10, provided that the phase set is set to 1 bit, the phase correction effect is reduced as compared to the other case in which the phase set of FIG. 9 is comprised of 2 bits, such that the beam gain ratio is slightly reduced to implement performance improvement of about 98.6%.

Figure 11:
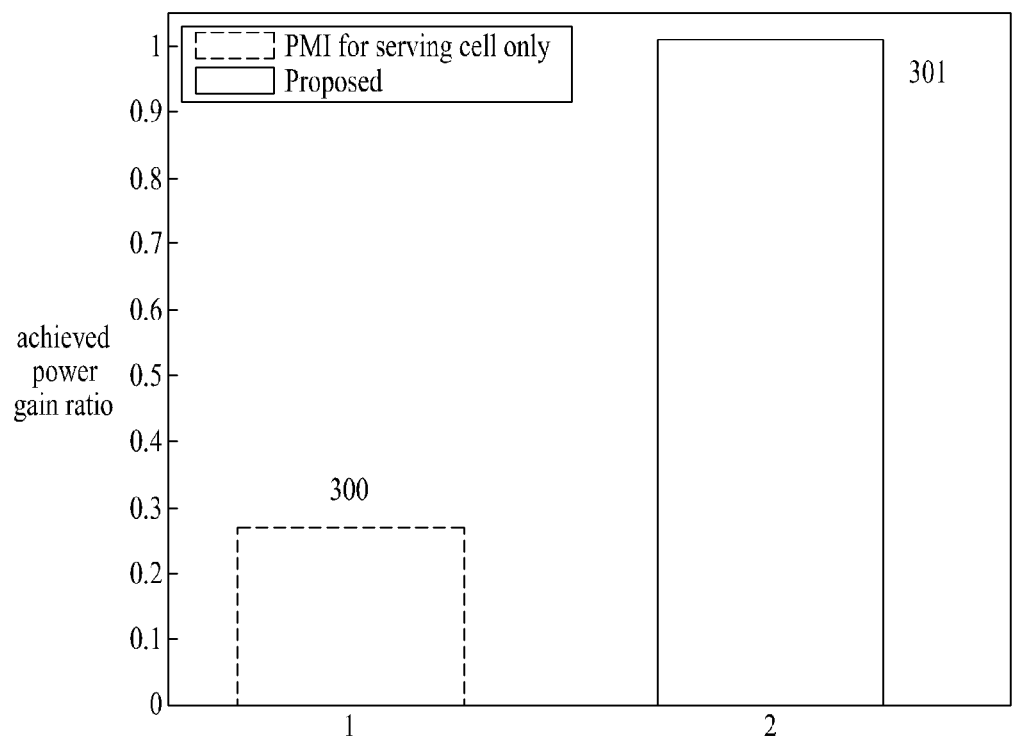
FIG. 11 shows another example of a beam gain performance comparison acquired by a precoder utilizing integrated feedback information under the condition that the joint processing (JP) scheme is used in the CoMP operation.

FIG. 11 shows another example of a beam gain performance comparison acquired by a precoder utilizing integrated feedback information under the condition that the joint processing (JP) scheme is used in the CoMP operation. Provided that the eNB and the UE have the same environment as shown in FIG. 6, the correlation between the eNB antennas of FIG. 11 is set to 0.9 and the phase set of FIG. 11 is comprised of 2 bits.

FIG. 11 shows that one case in which the integrated feedback information is utilized has higher performance as compared to the other case in which the integrated feedback information is not utilized. The second bar graph of FIG. 11 shows higher performance of about 97.8% as compared to the other case in which feedback information optimized for the JP scheme is utilized.

Therefore, in accordance with a method for transmitting the integrated feedback information, provided that the phase set optimized for the JP scheme is transmitted as feedback information using the PMI set and the CB PMI set optimized for the worst companion CB scheme, it can be recognized that the transmission result is almost identical to the result of the case in which the PMI and phase sets optimized for the JP scheme are fed back. In addition, provided that the transmission mode is the single-cell based scheme or the CB scheme used in the CoMP operation, the UE performs feedback transmission of the PMI set optimized for the worst companion CB scheme, such that the UE can obtain an optimum performance for each case.

As described above, according to the embodiments of the present invention, provided that the integrated feedback information is transmitted using the PMI set optimized for the CB scheme and the phase set optimized for the JP scheme derived from the CB PMI set, it is possible to indicate the optimum performances for individual transmission modes of the single-cell based MIMO, CB, and JP schemes using only the amount of transmission feedback information for performance optimized for the JP scheme.

As described above, the embodiments for explaining the integrated feedback information have disclosed the single-cell based SU-MIMO system based on the Rank-1 codebook, and the CB or JP system based on CoMP, etc.

Furthermore, the method for transmitting the integrated feedback information according to one embodiment of the present invention can be extended not only to systems utilizing the codebook of at least Rank 2 for multi-stream transmission, but also to the MU-MIMO system for enabling each eNB to simultaneously support a plurality of UEs. In this case, the matrix codeword instead of the vector codeword constructing the PMI set is utilized, and the UE may consider MRC (or matched filter), MMSE, zero-forcing, SIC filtering, etc. so as to obtain the PMI set optimized for the CoMP scheme. In addition, a criterion to be considered to acquire the optimum PMI set for each case may include channel gain maximization, channel capacity maximization, BER minimization, etc. In addition, the phase set contained in feedback information may be determined to be a phase set optimized for the JP scheme, or may be optimized for each phase component according to the number of bits allocated to the phase feedback se and the number of eNBs located in the vicinity of the UE.

The method for transmitting the integrated feedback information according to one embodiment of the present invention can be applied not only to one case in which the serving eNB does not request feedback for the optimum performance in a specific transmission mode, but also to another case in which the serving eNB requests feedback for the specific transmission mode. For example, provided that feedback information for the CB scheme is requested and a transmission mode of the eNB stays in the CB scheme, it is impossible to satisfy the link quality of a target UE using the CB scheme due to channel variation encountered in actual signal transmission, such that the CB scheme may be unexpectedly switched to the JP scheme. Alternatively, the single-cell based MIMO scheme may be switched to the transmission mode due to the backbone network problems.

As described above, provided that the integrated feedback information is utilized although the transmission mode is not specified or is changed during data transmission, the optimum performance can be adaptively satisfied for each transmission mode.

Now a description will be given of a UE and an eNB (femto BS (FBS) and macro BS (MBS)) for implementing the above-described exemplary embodiments of the present invention, according to another exemplary embodiment of the present invention.

The UE may operate as a transmitter on uplink and as a receiver on downlink, while the BS may operate as a receiver on uplink and as a transmitter on downlink. That is, each of the UE and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 12.

Figure 12:
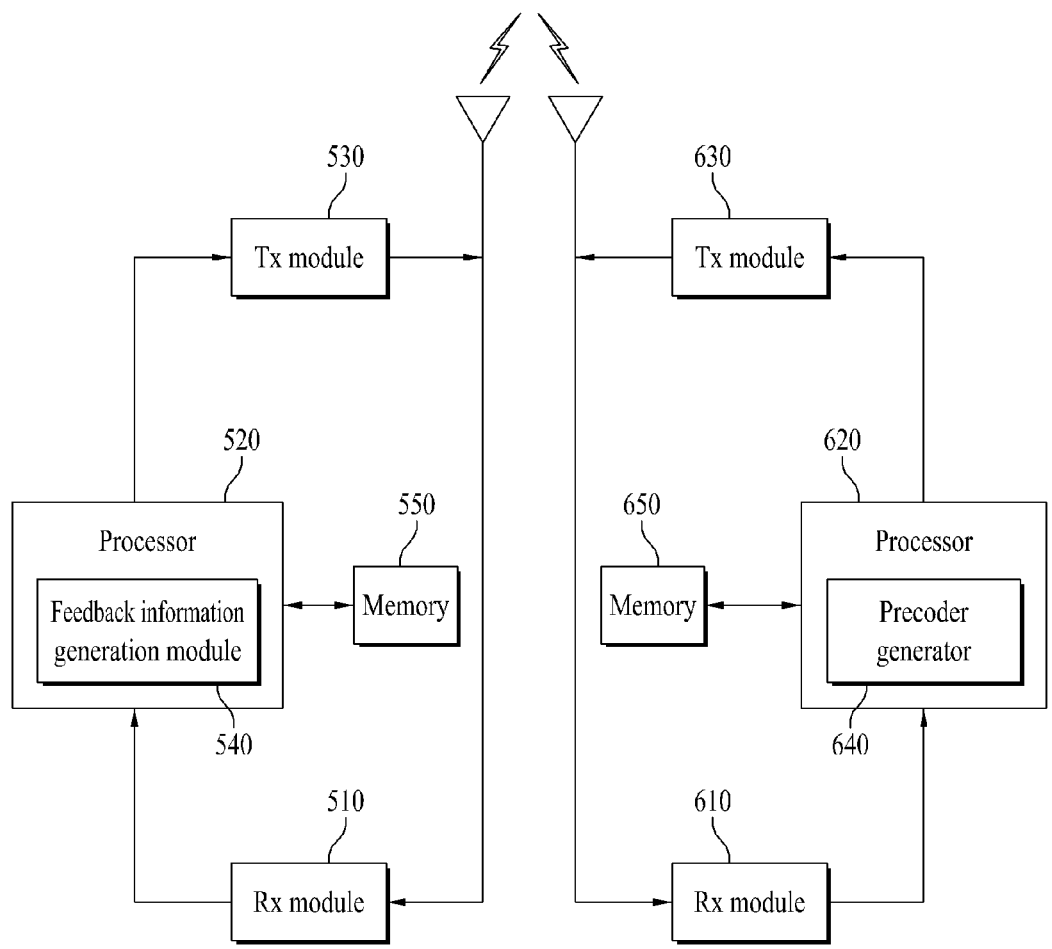
FIG. 12 is a block diagram illustrating a UE apparatus according to another embodiment of the present invention.

FIG. 12 is a block diagram of a UE and an eNB (FBS, MBS) applicable to embodiments of the present invention.

Referring to FIG. 12, the left part corresponds to the transmitter (i.e., the BS) and the right part corresponds to the receiver (i.e., the UE). Each of the transmitter and the receiver may include an antenna, a Reception (Rx) module 510 or 610, a processor 520 or 620, a Transmission (Tx) module 530 or 630, and a memory 550 or 650. The components of the transmitter are the counter parts of those of the receiver. The components of the transmitter and the receiver will be described below in more detail.

The antennas include Tx antennas for transmitting signals generated from Tx modules 530 and 630 and Rx antennas for receiving radio frequency (RF) signals and providing the received RF signals to the Rx modules 510 and 610. If Multiple Input Multiple Output (MIMO) is supported, two or more antennas may be provided.

The Rx modules 510 and 610 may recover original data by demodulating and decoding data received through the antennas and provide the recovered data to the processors 520 and 620. Although the Rx modules and the antennas may be separated from each other as shown in FIG. 12, it should be noted that the Rx modules and the antennas may also be denoted only by the receiver for receiving RF signals.

The processors 520 and 620 generally provide overall control to the transmitter or the receiver. Especially, the processors 520 and 620 may perform a controller function for implementing the above-described exemplary embodiments of the present invention, a variable MAC frame control function based on service characteristics and a propagation environment, a handover (HO) function, an authentication and encryption function, etc.

The Tx modules 530 and 630 perform predetermined coding and modulation for data, which is scheduled by schedulers connected to the processors 520 and 620 and transmitted to the outside, and then transfer the modulated data to the antennas. The Tx modules and the antennas may be separated from each other as shown in FIG. 12, it should be noted that the Tx modules and the antennas may also be denoted only by the transmitter for transmitting RF signals.

The memories 550 and 650 may store programs for processing and control of the processors 520 and 620, temporarily store input/output data (uplink (UL) grant, system information, station identifier (STID), flow identifier (FID), action time, etc. in case of the UE). In addition, each of the memories 550 and 650 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The Rx module 510 of the transmitter acting as an example of the UE may receive not only general data but also information of eNBs contained in the CoMP set through the Tx module 630 of the receiver acting as an example of the BS. For example, the Rx module 510 can receive signals from the serving eNB and at least one neighbor eNB contained in the CoMP set operated by the CB or JP scheme through the same band.

The processor 520 of the transmitter provides overall control to the UE apparatus, and includes a feedback information generation module 540 for generating feedback information. The feedback information generation module 540 may determine the integrated feedback information according to the above-mentioned embodiments. In more detail, although the transmission mode of the wireless communication system is determined to be the SU-MIMO mode or the CB or JP scheme of the CoMP operation, the feedback information generation module 540, the integrated feedback information capable of satisfying the optimum performance of a predetermined reference or higher is determined.

The feedback information generation module 540 estimates a channel status on the basis of a reference signal received from each eNB, and determines the PMI set capable of optimizing the system performance in the CB-based CoMP, because the CB scheme is more sensitive to PMI system performance than the JP scheme as previously stated in FIG. 4.

For example, when deciding the CB PMI set according to the best companion scheme, the feedback information generation module 540 may change the CB index to the JP index according to the predetermined index relationship. In order to prepare for the best companion scheme, the index change process for changing the index contained in the CB PMI set to the JP index may be predetermined in the memories 550 and 650 of the UE and the eNB. As a result, the feedback information generation module 540 acquires a predetermined index change calculation equation from the memory 550, such that the index contained in the CB PMI set is changed to the JP index. In addition, the feedback information generation module 540 determines the resultant JP index to be the PMI set optimized for the JP scheme, and determines the phase set, such that the integrated feedback information can be generated using the determined results.

That is, the PMI set optimized for the CB scheme is determined according to Equation 8, and the JP index is derived from the optimized CB index according to Equation 9 such that the JP PMI set is determined. In addition, the phase set optimized for the JP scheme is determined on the basis of the JP PMI set according to Equation 11, such that the precoding matrix may be comprised of one PMI set optimized for the CB scheme and another phase set that is optimized for the JP scheme through index change.

In another example, if the feedback information generation module 540 determines the CB PMI set according to the worst companion scheme, the PMI set for the worst companion CB may use the CB index as the JP index without change because phase correction performance for the JP scheme is higher than that of feedback information optimized for the JP scheme. Therefore, the integrated feedback information may be comprised of both a PMI set optimized for the CB scheme and a phase set derived from the CB PMI set without index change such that the phase set is optimized for the JP scheme.

The Rx module 610 of the transmitter acting as an example of the eNB receives the integrated feedback information from the UE, and transmits the received feedback information to the processor 620.

The processor 620 may further include a precoder generator 640 that generates the precoder capable of optimizing the system performance. The precoder generator 640 may adaptively configure the precoder according to transmission modes upon receiving the integrated feedback information from the UE. In this case, the process for performing the precoder generator 640 is changed according to whether the transmitted feedback information is acquired from the best companion scheme or the worst companion scheme.

For example, provided that the PMI set contained in feedback information is based on the best companion CB and the transmission mode is set to the CB mode, the precoder generator 640 may configure the precoder using the PMI set without change. If the transmission mode is set to the JP mode, the phase set is configured using the JP PMI set having an index changed for performance optimization in the JP scheme, the index change operation established in the memory 650 may be predetermined.

If the precoder generator 640 adaptively configures the precoder according to transmission modes upon receiving feedback information from the UE, the Tx module 630 transmits the signal coded by the generated precoder to the UE.

In the meantime, the eNB may perform a control function for implementing the above-described exemplary embodiments of the present invention, Orthogonal Frequency Division Multiple Access (OFDMA) packet scheduling, Time Division Duplexing (TDD) packet scheduling and channelization, a variable MAC frame control function based on service characteristics and propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

INDUSTRIAL APPLICABILITY

In accordance with the method for transmitting feedback information, the UE apparatus for utilizing the feedback information, and the eNB apparatus for performing the CoMP operation are applicable to various wireless communication systems including a $3^{rd}$ Generation Partnership Project (3GPP) LTE system, an LTE-A system, and/or an Institute of Electrical and Electronic Engineers (IEEE) 802 system.

The invention claimed is:

1. A method for transmitting feedback information by a user equipment (UE) in a wireless communication system in which at least one eNode B (eNB) performs a coordinated multi-point (CoMP) operation, the method comprising:
   receiving a reference signal from the at least one eNB;
   determining precoding matrix index (PMI) set information corresponding to the at least one eNB when the at least one eNB is operated in a coordinated beamforming (CB) scheme based upon the reference signal;
   determining phase set information for phase correction of beams formed by the at least one eNB when the at least one eNB is operated in a joint processing (JP) scheme basis upon the PMI set information of the CB scheme; and transmitting feedback information including the PMI set information of the CB scheme and the phase set information to a serving eNB from among the at least one eNB, wherein the feedback information is used in a case in which the at least one eNB is operated by the CB scheme and in another case in which the at least one eNB is operated by the JP scheme.

2. The method according to claim 1, wherein the determining of the PMI set information according to the CB scheme includes determining the PMI set information using a signal to interference ratio (SIR) value between the one or more eNBs.

3. The method according to claim 2, wherein when the PMI set information is determined to inform neighbor eNBs other than the serving eNB of a PMI for minimizing interference affecting the UE, the PMI set information includes an optimum weight for maximizing the SIR value of the serving eNB and an optimum weight for minimizing the SIR value of the neighbor eNB.

4. The method according to claim 1, wherein the determining of the phase set information includes:
changing each index contained in the PMI set information to an index for the JP scheme using predetermined index change calculation;
determining PMI set information for the JP scheme using the changed index; and
deriving the phase set information from the determined PMI set information of the JP scheme.

5. The method according to claim 4, wherein the index change calculation is arbitrarily established or is established to maximize a joint probability mass function (Joint PMF) between the index contained in the PMI set information and the changed index at a specific channel used by the at least one eNB.

6. The method according to claim 4, wherein the index change calculation is preset between the UE and the at least one eNB, sequentially uses a plurality of index change calculation schemes, or is shared between the UE and the at least one eNB through broadcast information.

7. The method according to claim 2, wherein when the PMI set information is deteimined to inform neighbor eNBs other than the serving eNB of a PMI for maximizing interference affecting the UE, the PMI set infoimation includes an optimum weight for maximizing the SIR value related to the serving eNB and the neighbor eNB.

8. The method according to claim 7, wherein the phase set information is derived from the PMI set information without execution of index change for the JP scheme.

9. A method for performing a Coordinated Multi-Point (CoMP) operation by an eNode B (eNB) in a wireless communication system, the method comprising:
transmitting a reference signal to a user equipment (UE);
receiving feedback information, that includes precoding matrix index (PMI) set information used when the eNB and at least one neighbor eNB are operated in a coordinated beamforming (CB) scheme and phase set information used when the eNB and the at least one neighbor eNB are operated in a joint processing (JP) scheme, from the user equipment (UE); and
transmitting a signal by constructing a precoder based upon the feedback information for case in which the eNB and the at least one neighbor eNB are operated in the CB scheme and the eNB and the at least one neighbor eNB are operated in the JP scheme.

10. The method according to claim 9, wherein the PMI set information corresponding to the CB scheme is determined using a signal to interference ratio (SIR) value between the eNB and the at least one neighbor eNB.

11. The method according to claim 10, wherein when the PMI set information is determined to inform the at least one neighbor eNB of a PMI for minimizing interference affecting the UE, the PMI set information includes an optimum weight for maximizing the SIR value of a serving eNB and an optimum weight for minimizing the SIR value of the at least one neighbor eNB.

12. The method according to claim 11, wherein when the eNB transmits a signal with the at least one neighbor eNB using the JP scheme, changing each index contained in the PMI set information to an index for the JP scheme through predetermined index change calculation, and configuring the precoder using the changed index and the phase set information.

13. The method according to claim 12, wherein the index change is performed either through an arbitrarily established calculation process or through a calculation process established to maximize a joint probability mass function (Joint PMF) between the index contained in the PMI set information and the changed index at a specific channel used by the eNB.

14. The method according to claim 12, wherein the index change calculation is pre-established between the UE and the eNB, sequentially uses a plurality of index change calculation schemes, or is shared between the UE and the eNB through broadcast information.

15. The method according to claim 10, wherein when the PMI set information is configured to infonn the at least one neighbor eNB of a PMI for maximizing interference affecting the UE, the PMI set information includes an optimum weight for maximizing the SIR value related to the and the at least one neighbor eNB.

16. The method according to claim 15, wherein the phase set information is derived from the PMI set information without execution of index change for the JP scheme.

17. A user equipment (UE) for transmitting feedback information in a wireless communication system in which at least one eNB performs a coordinated multi-point (CoMP) operation, the user equipment (UE) comprising:
a reception module configured to receive a reference signal from the at least one eNB;
a processor configured to determine precoding matrix index (PMI) set information corresponding to the at least one eNB when the at least one eNB is operated in a coordinated beamforming (CB) scheme based upon the reference signal, determining phase set information for phase correction of beams formed by the at least one eNB when the at least one eNB is operated in a joint processing (JP) scheme on the basis of the PMI set information of the CB scheme, and generating feedback information including the PMI set information of the CB scheme and the phase set information; and
a transmission module configure to transmitting the feedback information to a serving eNB from among the at least one eNB,
wherein the feedback information is used in a case in which the at least one eNB is operated by the CB scheme and in another case in which the at least one eNB is operated by the JP scheme.

18. The user equipment (UE) according to claim 17, further comprising:
a memory configured to store index change calculation to change the index contained in the PMI set information to an index for the JP scheme when the PMI set information is determined to inform neighbor eNBs other than the serving eNB of a PMI for minimizing interference affecting the UE.

19. An eNode B (eNB) for performing a Coordinated Multi-Point (CoMP) operation in a wireless communication system, the eNB comprising:

a transmission module configured to transmit a reference signal to a user equipment (UE);

a reception module configured to receive feedback information, that includes precoding matrix index (PMI) set information used when the eNB and at least one neighbor eNB are operated in a coordinated beamforming (CB) scheme and phase set information used when the eNB and the at least one neighbor eNB are operated in a joint processing (JP) scheme, from the user equipment (UE); and a processor configured to construct a precoder based upon the feedback information for case in which the eNB and the at least one neighbor eNB are operated in the CB scheme and the other case in which the eNB and the at least one neighbor eNB are operated in the JP scheme, and transmitting signals through the transmission module.

20. The eNode B (eNB) according to claim 19, further comprising:

a memory configured to store index change calculation to change the index contained in the PMI set information to an index for the JP scheme, when the PMI set information is determined to inform at least one neighbor eNB other than the serving eNB of a PMI for minimizing interference affecting the UE.

* * * * *